US012687603B1

(12) United States Patent
Wu

(10) Patent No.: US 12,687,603 B1
(45) Date of Patent: Jul. 21, 2026

(54) SYSTEMS AND METHODS FOR SECURELY FACILITATING DATA COMMUNICATION WITH ULTRA-WIDEBAND OR BLUETOOTH LOW ENERGY

(71) Applicant: United Services Automobile Association (USAA), San Antonio, TX (US)

(72) Inventor: Huihui Wu, Grapevine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 686 days.

(21) Appl. No.: 17/986,622

(22) Filed: Nov. 14, 2022

Related U.S. Application Data

(60) Provisional application No. 63/282,504, filed on Nov. 23, 2021.

(51) Int. Cl.
*G01S 5/02* (2010.01)
*H04W 64/00* (2009.01)

(52) U.S. Cl.
CPC .......... *G01S 5/0263* (2013.01); *G01S 5/0284* (2013.01); *H04W 64/003* (2013.01)

(58) Field of Classification Search
CPC ... G01S 5/0263; G01S 5/0284; H04W 64/003
See application file for complete search history.

(56) References Cited

U.S. PATENT DOCUMENTS

| | | | | |
|---|---|---|---|---|
| 2003/0054817 A1* | 3/2003 | Goldberg | ................. | G08G 5/21 |
| | | | | 455/431 |
| 2012/0057456 A1* | 3/2012 | Bogatin | ................. | H04W 4/80 |
| | | | | 370/230.1 |
| 2013/0027561 A1* | 1/2013 | Lee | ................... | H04N 23/611 |
| | | | | 705/7.41 |
| 2014/0086141 A1* | 3/2014 | Morioka | ............... | H04W 52/02 |
| | | | | 370/315 |
| 2014/0361928 A1* | 12/2014 | Hughes | ................. | G01S 5/0221 |
| | | | | 342/463 |
| 2021/0288764 A1* | 9/2021 | Linsky | .................. | H04L 65/611 |
| 2022/0137177 A1* | 5/2022 | Hammerschmidt | .... | G01S 7/006 |
| | | | | 455/456.1 |
| 2023/0060554 A1* | 3/2023 | Kono | ...................... | G01S 11/06 |

* cited by examiner

*Primary Examiner* — Matthew D. Anderson
*Assistant Examiner* — Abdullah Al Mamun
(74) *Attorney, Agent, or Firm* — Fletcher Yoder, P.C.

(57) ABSTRACT

A method may include receiving, via the communication mode adjustment circuitry, an indication from a user and receiving anchor characteristics indicative of one or more of anchors. The method may then involve determining whether the anchor characteristic indicates precise location tracking is needed and activating a data communication mode, an audio communication mode, or both. The method may also involve connecting the one or more anchors and transmitting data to the one or more anchors.

20 Claims, 4 Drawing Sheets

SYSTEMS AND METHODS FOR SECURELY FACILITATING DATA COMMUNICATION WITH ULTRA-WIDEBAND OR BLUETOOTH LOW ENERGY

CROSS-REFERENCE TO RELATED APPLICATION

The application claims priority to and the benefit of U.S. Provisional Application No. 63/282,504, entitled "SYSTEMS AND METHODS FOR SECURELY FACILITATION DATA COMMUNICATIONS WITH ULTRA-WIDEBAND OR BLUETOOTH LOW ENERGY," filed Nov. 23, 2021, which is hereby incorporated by reference in its entirety for all purposes.

BACKGROUND

The present disclosure relates generally to systems and methods for using ultra-wideband (UWB) or Bluetooth low-energy (BLE) to facilitate data communication between one or more devices. More specifically, the present disclosure relates to switching between a UWB mode, a BLE mode, and a hybrid BLE/UWB mode to securely facilitate data communication to one or more devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Consumers and enterprises may use BLE or WiFi to facilitate data communication between one or more devices. For example, a consumer may use BLE to transmit audio from a mobile device to a pair of wireless headphones when listening to music. In another example, an enterprise may use a daisy chain network to connect all of their devices to WiFi for network connection. However, the consumer or enterprise may want to transmit data quickly and precisely from one or more devices to one or more particular target devices. Unfortunately, however, BLE may provide less precision than desired in finding a target device and WiFi may be power-hungry and may utilize a more complex communication establishment process. As such, improved systems and methods for securely directing signals with UWB are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include of one or more anchors and a communication mode adjustment circuitry. The communication mode adjustment circuitry may be configured receive an anchor characteristic representative of the one or more anchors and determine whether the anchor characteristic indicates precision is needed. The communication mode adjustment circuitry may also activate ultra-wideband (UWB) tracking in response to determining that precision is needed.

In another embodiment, a process may include receiving, via the communication mode adjustment circuitry, an indication from a user and receiving, anchor characteristics indicative of one or more of anchors. The communication mode adjustment circuitry may also determine whether the anchor characteristic indicates precise location tracking is needed and activate a data communication mode, an audio communication mode, or both. The communication mode adjustment circuitry may also connect to the one or more anchors and transmit data to the one or more anchors.

In yet another embodiment, a non-transitory computer-readable medium comprising computer-executable instructions that, when executed by at least one processor, causes the at least one processor to connect to one or more anchors and receive an anchor characteristic that is representative of one or more anchors. The processor may also determine whether the anchor characteristic indicates precision is needed and activate a Bluetooth low-energy (BLE) mode in response to determining that precision is not needed. The processor may also transmit anchor data from a first anchor to a target device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
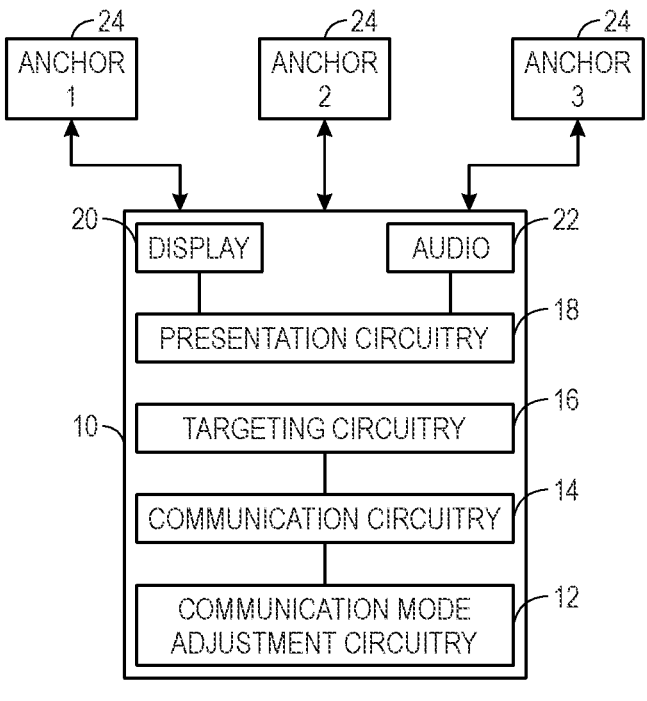
FIG. 1 illustrates a block diagram of a system communicatively coupled to a number of anchors, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Some consumers and enterprises may want to wirelessly transmit data securely and precisely from one or more anchors to a target device, considering a precise location of the target device and using an energy-efficient mechanism for communication. Such energy-efficient and secure communication may be desirable in a number of applications.

In some embodiments, an enterprise may create a daisy chain network of anchors (e.g., ultra-wideband sensors, industrial sensors) and may have the one or more anchors transmit data from a first anchor to one or more intermediate anchors to a target device (e.g., server, client device). As such, the enterprise may leverage ultra-wideband (UWB) to securely transmit the data over the daisy chain network while also precisely tracking characteristics (e.g., status, location) of the anchors.

In certain embodiments, the enterprise may monitor equipment (e.g., underground pipes, crowded rig/platform components, network cables, etc.) by placing anchors (e.g., ultra-wideband sensors, industrial sensors) on their equipment and tracking the status of the anchor. That is, the one or more anchors may maintain status indications of associated equipment and transmit signals (e.g., good, bad, green, red) based on the status indications which may be indicative of the health or performance of the equipment. As such, the one or more anchors may provide a warning to the enterprise in case their equipment may be failing. In some embodiments, the enterprise may use special (e.g., augmented reality, virtual reality) glasses to view the status of the one or more anchors.

With the foregoing in mind, consumers and enterprises may utilize ultra-wideband (UWB), Bluetooth low-energy (BLE), or hybrid BLE/UWB to transmit data across one or more anchors (e.g., industrial sensors) (e.g., in some instances connected in a daisy chain network). For example, the enterprise may utilize industrial sensors linked in the daisy chain network and UWB to facilitate data communications in unreliable network conditions (e.g., oil field). That is, the enterprise may place multiple industrial sensors on underground oil pipes and have the industrial sensors communicate from a first industrial sensor to one or more intermediate sensors to a target device (e.g., central controller, server, client device) that accumulates the transmitted data. In some embodiments, the industrial sensors may be placed in close proximity and the computing system may use UWB to facilitate data communication. In other embodiments, the industrial sensors may be placed in a sparse environment and the computing system may utilize BLE to facilitate data communication. As such, the computing system may determine a preferred path from the first industrial sensor to the central controller within the daisy chain network (e.g., quickest path, shortest time). In some embodiments, the computing system may determine a direct path from the first industrial sensor to the target device. In other embodiments, the computing system may determine the preferred path passes through one or more intermediate anchors in operational mode. The central controller may accumulate or aggregate the transmitted data and after a threshold amount of time passes, the central controller may transmit the data over a network to a more reliable connection for the enterprise to view. In other embodiments, the central controller may immediately transmit the data over the network for the enterprise to view the data in real-time.

In another example, the computing system may operate in a hybrid BLE/UWB mode when facilitating data communication from the first anchor to the target device. That is, the computing system may utilize both UWB and BLE for data transmission without interfering with conventional narrowband and carrier wave transmission in the same frequency. The computing system may determine a need for precise location tracking to determine a preferred data communication mode (e.g., a UWB mode, a BLE mode, or a hybrid BLE/UWB mode) for facilitating data communication from the anchor to the target device. That is, the precision for location accuracy of UWB may be between 10 and 30 cm while the precision for location accuracy of BLE may be between 0 to 25 m. As such, the computing system may determine the need for precise location tracking in the environment and transmit instructions to the one or more anchors to operate in the desired data communication mode. In an example, the one or more anchors may transmit homogenous data (e.g., unified summary) to the target device and the computing system may determine that precise location tracking may not be necessary since there may not be unique data. As such, the computing system may determine that the UWB mode may not be the preferred data communication mode and instruct the one or more anchors to switch over to the BLE mode to present the unified summary.

Additionally or alternatively, some consumers or enterprises may want to precisely track the locations and statuses of the one or more anchors (e.g., industrial sensors) on their equipment. For example, the enterprise may instruct their industrial sensors to communicate via UWB in crowded environments to monitor the precise locations of their equipment. That is, the UWB mode may be the preferred mode since location accuracy may be between 10 and 30 cm and data requests may be up to 100 times/second. In an example, the enterprise may have bundled equipment (e.g., network of cables or pipes) and may be interested in monitoring the status of their equipment by placing one or more anchors (e.g., industrial sensors) on the bundled equipment to track the health and/or performance of their bundled equipment. As such, the industrial sensors may allow the enterprise to quickly and easily check the health or status of the equipment without taking apart the bundled equipment. In one embodiment, the enterprise may use special (e.g., augmented reality, virtual reality) glasses to view data from the one or more industrial sensors attached to the equipment. For example, the augmented reality glasses may receive unique data from one industrial sensor and display a red light on the augmented reality glasses allowing the enterprise to pinpoint the location of problematic equipment.

With the foregoing in mind, some consumers or enterprises may want to connect with one or more anchors (e.g., devices) to facilitate audio communication. That is, the enterprise may choose between different data communication modes (e.g., the BLE mode, the UWB mode, the BLE/UWB mode) and different audio communication modes (e.g., a broadcast mode, a peer-to-peer or peers mode) to facilitate data communication between the one or more anchors and a UWB communication device (e.g., microphone, headset, earbuds, computer). For example, the enterprise may indicate to a microphone to operate in the broadcast mode and facilitate audio communication to all available anchors. As such, the computing system may determine that precise location tracking may not be required and switch to facilitating data communication in the BLE mode. In another example, the enterprise may indicate to the microphone to operate in the peer-to-peer or peers mode and point to a precise location (e.g., desired direction, specific device or devices) to initiate a handshake between the devices. In some instances, the consumer may want to communicate with a subsets of anchors (e.g., devices in a left half of the room, devices in a right half of the room). As such, the one or more anchors may be identified based upon a return timing observed from the receivers of various UWB communication devices. That is, one benefit of different modes may be power saving technology that selectively choosing between the UWB, the BLE, or the hybrid BLE/UWB connection based upon how precise of a location may be needed. For example, when in a sparse environment, the UWB communication device may use BLE to accurately identify the one or more anchors, whereas a crowded environment may require precise location tracking. As such, the UWB communication device may switch over to the UWB mode after a particular range is determined from the BLE mode.

By way of introduction, FIG. 1 is a block diagram of a system communicatively coupled to one or more anchors. The system may include a computing system 10 communicatively coupled to a variety of anchors 24 that may electronically communicate with the computing system 10. In some embodiments, the computing system 10 may be a UWB communication device that provides data to or from the anchors. For example the computing system 10 could be an audio and/or video communication system, augmented reality glasses, or other device that provides data to or from one or more anchors 24. The computing system 10 may include communication mode adjustment circuitry 12, communication circuitry 14, targeting circuitry 16, presentation circuitry 18, a display 20, and/or an audio communication channel 22. The communication mode adjustment circuitry 12 may determine and set the data communication mode (e.g., the BLE mode, the UWB mode, the BLE/UWB mode) between the computing system 10 and the one or more anchors 24 (e.g., electronic devices) in the environment (e.g., industrial environment, oil field, conference room, concert venue). The targeting circuitry 16 may target one or more anchors 24 causing the one or more anchors 24 to begin data communication with the computing system 10.

For example, in an embodiment where the computing system 10 is configured to cause the anchor to pinpoint itself (e.g., based upon a status indication), the targeting circuitry 16 may receive the status of the anchor and cause the one or more anchors 24 to display different colors (e.g., green, yellow, red) or different texts (e.g., good, bad, fair), based upon the received status. For example, the computing system 10 may, in response to receiving an error indication from a particular anchor, provide a command to the particular anchor to cause a light indicator to flash, to cause an audio indicator to activate, or both.

In another example, the targeting circuitry 16 may cause the one or more anchors 24 to transmit an identification with anchor characteristics (e.g., status, location, mode of operation) to the computing system 10. The presentation circuitry 18 may present the signal from the one or more anchors 24 to the display 20 or to the audio communication channel 22 for user consumption. For example, in an embodiment where the computing system 10 is tasked with pinpointing particular anchors based upon a status of the anchor, the targeting circuitry 16 may receive the status of the anchor and cause the display 20 (e.g., an augmented reality display) to display an indication of the status of a component (e.g., different colors (e.g., green, yellow, red) or different texts (e.g., good, bad, fair)) in a location of an augmented view corresponding to the component. In this manner, status indications may be provided in a very efficient manner.

In some embodiments, the computing system 10 may provide multiple possible modes of operation (e.g., UWB mode, BLE mode, or hybrid UWB/BLE mode). In such embodiments, the communication mode adjustment circuitry 12 may determine the data communication mode (e.g., the UWB mode, the BLE mode, or the BLE/UWB mode) for facilitating data communication between the computing system 10 and the one or more anchors 24 (e.g., via the communication circuitry 14). The communication mode adjustment circuitry 12 may use environmental features and/or other inputs to identify a proper mode of communication to implement between the computing system 10 and the one or more anchors 24.

For example, in some embodiments a mode of communication may be selected based upon how crowded anchors are with respect to one another. When crowded, precise location tracking of the anchors may be necessary to identify a particular desired target anchor. The computing system 10, via the communication mode adjustment circuitry 12, may determine whether precise location tracking may be needed in the current environment (e.g., based upon the anchor spacing being sparse or crowded). For example, the anchors 24 may be placed in a crowded environment (e.g., conference room) and the computing system 10 may want to locate a specific anchor for data communication (e.g., audio transfer). As such, the computing system 10 may determine that precise location tracking may be needed and that the UWB mode may be the preferred mode (as it has more precise tracking ability compared to BLE). In another example, the one or more anchors 24 may be placed the crowded environment (e.g., conference room) and the computing system 10 may want to locate a subset of the one or more anchors 24 (e.g., right half of the conference room) to facilitate data communication (e.g., audio transfer). As such, the computing system 10 may determine that the hybrid BLE/UWB mode may be preferred. That is, the UWB communication device may use the BLE mode to identify the range of the subset of anchors 24 and switch over to the UWB mode to identify the subset of anchors 24 to perform the handshake. That is, the computing system 10 may utilize the UWB mode for its precise location tracking and identify one or more anchors 24 that are part of the subset of anchors 24. In still another example, the computing system 10 may determine that the anchors may be spaced sparsely and, therefore, less precise location tracking can be used. In such a scenario, the communications mode adjustment circuitry 12 may select and implement the BLE mode, as it provides better energy efficiency while still enabling location tracking at a level useful for sparsely spaced anchors.

In some embodiments, the BLE mode may also be used when particular anchors do not need to be pinpointed. For example, in a broadcast mode of a communications device (e.g., an audio microphone), no particular anchor may need pinpointing or a less-granular subset of anchors may need to be location tracked but may be pinpointed via less granular location tracking. In such a case, the communication mode adjustment circuitry 12 may select BLE mode.

Further, in some embodiments, the data received by the computing system 10 may indicate that no particular anchor needs to be pinpointed for data presentation. In such embodiments, the received data from the anchors may be said to be "unified" or may be analogous across the range of anchors and as such, precise location tracking may not be needed. For example, in embodiments where the computing system 10 provides an augmented status indication for anchors, when the anchors all provide a common status (e.g. "good"), rather than pinpointing a particular anchor, a unified summary of the status may be presented. For example, a green indicator may indicate that all anchors in a viewable range have a "good" status, rather than processing/rendering an indicator for each anchor with a common status. As such, the computing system 10 may determine that transmitting the unified summary may not require precise location tracking and may operate in the BLE mode to save energy.

The communication circuitry 14 may include wireless or wired communication circuitry that may facilitate communication between the computing system 10 and various other computing systems and devices via a network, the Internet, or the like. For example, the communication circuitry 14 may allow the computing system 10 to obtain the data from the one or more anchors 24 and transmit the anchor data across the network. The communication circuitry 14 may also receive and send notifications or other data to the one or more anchors 24. In some embodiments, the communication circuitry 14 may transmit data from the target device to a more reliable/persistent connection for the user to view. For example, the target device may accumulate or aggregate data from the one or more anchors 24 and after a threshold amount of time passes, the computing system 10, via the communication circuitry 14, may transmit the data over the network to the more reliable connection for the user to view. The communication circuitry 14 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or any combination thereof.

Data from the one or more anchors 24 may include the anchor characteristics such as a status, a location, an equipment health and/or performance, or any combination thereof. The status may include data regarding the current operational status of the anchor such as a standby mode, an operational mode, a failure mode, or the like. The location data of the anchor may include a GPS location, a coordinate data, an additional anchor connection, or the like. The equipment status data may include data regarding the health or performance of the corresponding equipment. Data from the one or more anchors 24 may be viewed on the augmented reality glasses in the form of light signals indicative of associated equipment status. For example, a red light may allow the enterprise to pinpoint the location of problematic equipment. Data from the one or more anchors 24 may be gathered from one or more industrial sensors, UWB sensors, audio communication devices (e.g., microphones, headsets, earbuds, computers), or the like.

The targeting circuitry 16 may receive indication from the user regarding the one or more anchors 24 to target for data communication. For example, the user (e.g., conference speaker) may use the computing system 10 to target the subset of anchors 24 (e.g., right half of the audience) to deliver data (e.g., special message). As such, the computing system 10, via the targeting circuitry 16, may initiate the handshake with the subset of anchors 24 located in the right half of the audience. In some embodiments, the user may set criteria (e.g., status, location) to verify before the devices may handshake. For example, the status of the targeted anchor may be in an operational mode and available for connection to the computing system 10. As such, the handshake may generate a connection between the computing system 10 and the targeted anchor. In another example, the targeting circuitry may receive anchor characteristics (status, location) indicating that the subset of anchors 24 may be located in the right half of the audience. As such, the subset of anchors 24 may receive the request for handshake, generate the connection, and begin data communication with the computing system 10. As such, the computing system 10, via the targeting circuitry 16, may verify that the anchor characteristics match the set criteria before requesting the handshake. In some embodiments, the anchor characteristics status and/or location of the anchor may fit the predetermined criteria of the handshake and the targeting circuitry 16 may determine that the anchor 24 may be part of the desired subset of anchors 24 to target. In some embodiments, the computing system 10 may receive anchor characteristics for one or more anchors 24 in the environment and use anchor characteristics to group the subset of anchors 24 for data transmission.

In another example, the computing system 10, via the targeting circuitry 16, may use anchor characteristics to determine the equipment health or performance. For example, the one or more anchors 24 (e.g., industrial sensors) may attached to equipment that may be closely bundled in the environment. The anchor characteristics of the one or more anchors may indicate the health or performance of the equipment. As such, computing system 10 may target the one or more anchors 24, receive the anchor data indicative of equipment health, and display different colors (e.g., green, yellow, red) reflective of the equipment health or performance. In some embodiments, the one or more anchors 24 may provide different status in its anchor characteristics (e.g., a standby mode, an operational mode, a failure mode) which may be indicative of the current mode of operation. In other embodiments, the one or more anchors may in the standby mode until the computing system 10 requests the one or more anchors 24 to switch to the operational mode. For example, the user may want to know the status of their equipment and may signal to the computing system 10 to display a status indication of the equipment in an environment. The computing system 10 may receive anchor characteristics indicative of associated equipment status. Using UWB, precise location can be discerned for anchor sources of the anchor characteristics and anchor indicators can be rendered in an augmented display, targeting the precise locations of the source anchors providing the anchor characteristics. The user may view the anchor data by wearing the special (e.g., augmented reality, virtual reality) glasses and receive the anchor data regarding the equipment health and/or performance status in real-time.

The presentation circuitry 18 may transmit the anchor data to the display 20 or to the audio communication channel 22 for the user to consume. For example, the user may be interested in knowing their equipment health and/or performance in an unreliable network (e.g., oil field). In certain conditions, the user may not be able or may not want to physically check their equipment. As such, the user may request the computing system 10, via the presentation circuitry 18, to transmit the anchor data to the display 20 for the user to view. In another embodiment, the user may request the computing system 10 8, to transmit audio from the audio communication channel 22 to the subset of anchors 24. In other embodiments, the anchors 24 may facilitate data communication between themselves via the audio communication channel 22.

In one embodiment, the display 20 may be a touch display capable of receiving inputs from an operator of the computing system 10. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the computing system 10. The display 20 may operate as a human machine interface (HMI) to depict visualizations associated with software or executable code being processed by the computing system 10.

In some embodiments, the audio communication channel 22 may be a channel capable of receiving inputs from the user of the computing system 10. In other embodiments, the audio communication channel 22 may direct audio signals from the computing system 10 to the one or more anchors. The audio communication channel 22 may receive radio waves in UWB ranges, BLE ranges, or any combination thereof. The audio communication channel 22 may be any suitable type of communication channel, such as a port, a wireless connection, for example.

It should be noted that the components described above with regard to the computing system 10 are examples and the computing system 10 may include additional or fewer components relative to the illustrated embodiment.

Although the one or more anchors 24 are described as being communicatively coupled to the computing system 10 via UWB, BLE, or BLE/UWB it should also be noted that, in other embodiments, the one or more anchors 24 may be communicatively coupled directly to the computing system 10.

Figure 2:
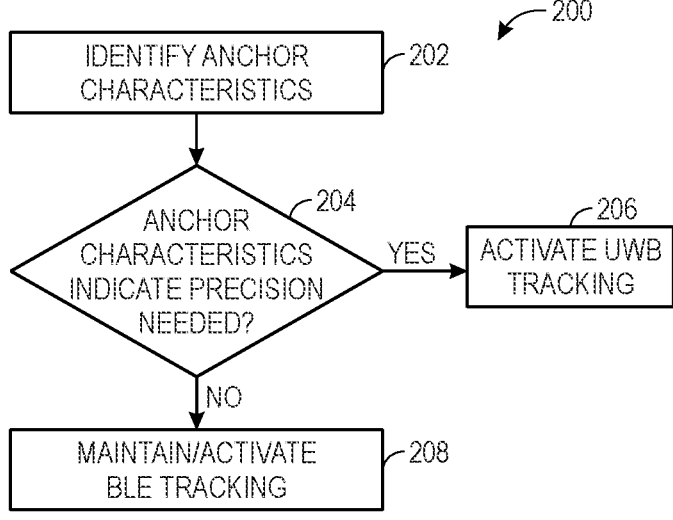
FIG. 2 illustrates a flow chart of a process for changing between a Bluetooth low-energy mode and an Ultra-Wideband mode, in accordance with embodiments described herein.

The computing system 10, via the communication mode adjustment circuitry 12, may determine the preferred data communication mode. With the foregoing in mind, FIG. 2 illustrates an example process 200 for determining between the data communication modes (e.g., the UWB mode, the BLE mode, the hybrid BLE/UWB mode). That is, the computing system 10 may execute machine-readable code to determine whether precise location tracking may be useful in the environment and activate the preferred data communication mode. For example, the computing system 10 may receive the anchor characteristics (e.g., status, location, equipment health) and use it to determine preferred mode of data communication.

Although the process described in FIG. 2 is described in a particular order, it should be noted that the example process 200 may be performed in any suitable order and is not limited to the order presented herein. It should also be noted that although each processing block is described below is the example process 200 as being performed by the computing system 10, other suitable computing systems may perform the processes described herein.

Referring now to FIG. 2, at block 202, the computing system 10 may identify an anchor characteristics (e.g., status, location, equipment health). For example, the status indicator may indicate whether the anchor is operating in the standby mode, the operational mode, or the failure mode, particular status information provided by the anchors, etc. The location may indicate the GPS location, the coordinate data, and/or the additional anchor connections of the anchor.

Using the anchor characteristics, the computing system 10 may determine the environment characteristics. In particular, a determination may be made as to whether the anchors are spaced relatively sparsely or relatively crowded and/or whether any anchors are providing divergent information within a relatively close proximity to another anchor. This information may be used to determine whether precise tracking is needed. That is, at block 204, the computing system 10 may analyze the received anchor characteristics to determine whether precise location tracking may be needed. For example, the computing system 10 may analyze the status indicator of the one or more anchors 24 and determine that all anchors 24 may be providing common status information. As such, the computing system 10 may determine that precise location tracking may not be needed since the one or more anchors 24 present unified data and a unified summary can be presented. This could be true regardless of whether the anchors 24 are close in proximity to one another. In another example, the computing system 10 may analyze the location of the one or more anchors 24 and determine that the one or more anchors 24 may be spaced closely together and, optionally, that they are providing divergent data that should be attributed specifically to one or more of the anchors. As such, the computing system 10 may determine that precise location tracking may be needed to distinguish the one or more anchors 24. Still in another example, the computing system 10 may receive indication from the user to target specific anchors 24 (e.g., by pointing at a particular anchor) that are closely spaced (e.g., closer than a pre-defined threshold distance that indicates whether precise location tracking should be used) and may determine that precise location tracking may be needed to identify the specific anchor 24.

With the foregoing in mind, at block 206, the computing system 10 may determine that the anchor characteristics indicate that precise location tracking may be needed and may activate the UWB mode in response to determining that precise location tracking may be needed. As such, the computing system 10 may indicate to the one or more anchors 24 to communicate in the UWB mode, enabling precise location tracking between the computing system 10 and the anchors 24. For example, the computing system 10 may want to receive the precise location of closely spaced anchors 24. As such, the computing system 10 may communicate to the closely spaced anchors 24 in the UWB mode to ensure precise location accuracy. In another embodiment, the computing system 10 may begin data communication in the UWB mode and determine that precise location tracking may not be needed. As such, the computing system 10 may switch over to the BLE mode or the BLE/UWB mode to save energy. For example, the computing system 10 may receive indication from the user to target specific anchors 24 and determine that the UWB mode may be the preferred mode for data communication.

Additionally or alternatively, the computing system 10 may determine from the anchor characteristics that precise location tracking may not be needed. For example, when the anchor spacing is sparse (e.g., over a threshold distance) and/or the anchors are providing unified data that can be presented in a unified summary, less precise location may be used. At block 208, the computing system 10 may maintain or activate BLE tracking in response to determining that precise location tracking may not be needed. For example, the computing system 10 may determine that the one or more anchors 24 may be located in the sparse spacing and as such, the computing system 10, via the targeting circuitry 16, may be able to easily identify the one or more present anchors 24 in the BLE mode. In another example, the computing system 10 may determine that the one or more anchors 24 present the unified summary. As such, the computing system may determine that the BLE mode may be the preferred mode for facilitating data communication between the anchors 24.

As environmental characteristics change, the need for precise location tracking may also change. Accordingly, the process 200 can be iterative, adjusting to new anchor characteristics as they occur. For example, the computing system 10 may determine that the environment spacing of anchors may change from a close spacing (e.g., below a threshold distance) to a sparse spacing (e.g., above a threshold distance). In this manner, the communication mode may transition from the UWB mode to the BLE mode for data communication.

Still in another example, the computing system 10 may begin data communication in the BLE mode but may have difficulty distinguish between the subset of anchors 24. As such, the computing system 10 may switch over to the UWB mode or the BLE/UWB mode to distinguish the subset of anchors 24 for accurate data communication.

Figure 3:
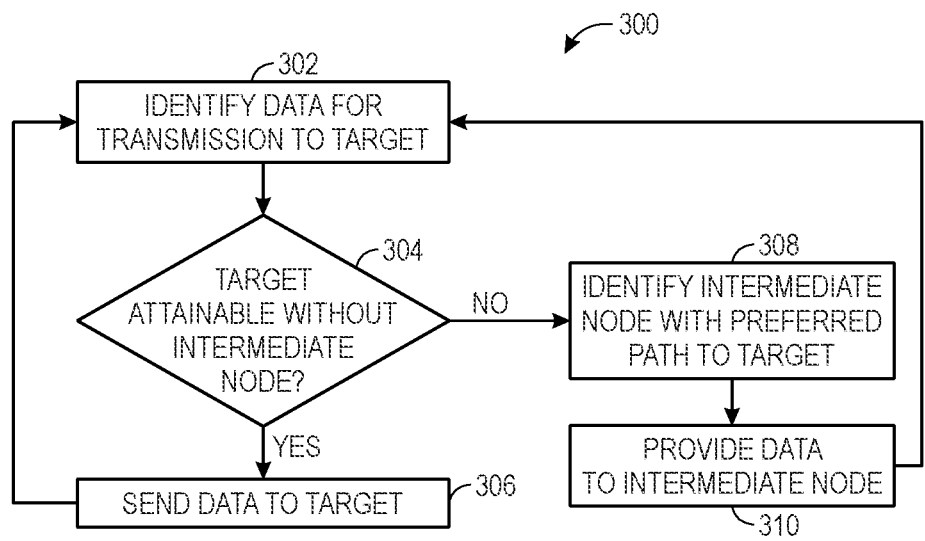
FIG. 3 illustrates a flow chart of a process for transmitting data along network of one or more anchors, in accordance with aspects of the present disclosure.

With the foregoing in mind, FIG. 3 illustrates an example process 300 for facilitating data communication among the one or more anchors 24 connected in the daisy chain network. That is, is may be desirable to facilitate data communication from the first anchor 24 to one or more intermediate anchors to the target device (e.g., server, client device). In some embodiments, the first anchor 24 may not directly communicate with the target device. For example, in the field, electronic devices are far from their target data destination. As such, the computing system 10 may utilize the anchor characteristics to determine the preferred path between the first anchor 24 and the target device.

Although the example described in FIG. 3 is described in a particular order, it should be noted that the example process 300 may be performed in any suitable order and is not limited to the order presented herein. It should also be noted that although each processing block is described below is the example process 300 as being performed by the computing system 10, other suitable computing systems may perform the processes described herein.

Figure 4:
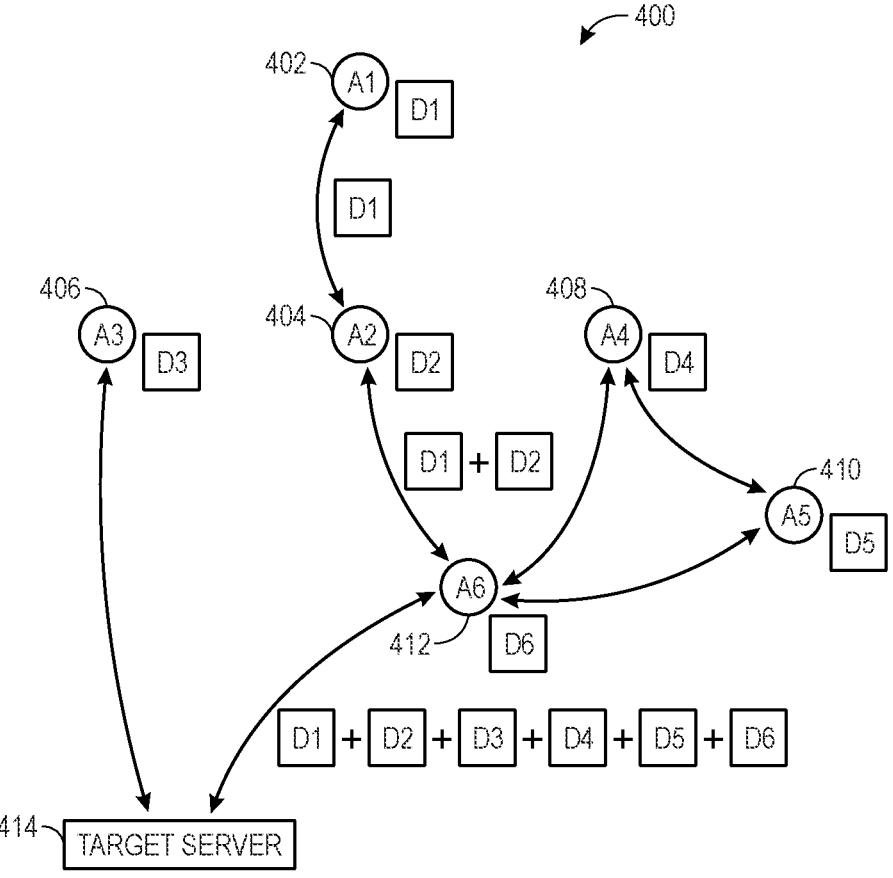
FIG. 4 illustrates the one or more anchors linked in the network of FIG. 3, in accordance with aspects of the present disclosure.

With the foregoing in mind. FIG. 4 is an embodiment of one or more anchors 24 connected in the daisy chain network. In some embodiments, the computing system 10 may facilitate the data communication mode in the UWB mode. For example, the sending anchor may be linked to the one or more intermediate anchors between the sending anchor and the target device 414. Further, in some embodiments, the sending anchor may be directly linked to the target device 414 (e.g., server, client device). Given that many pathways may exist between the sending anchor and the target device 414, FIG. 4 provides one process for selecting a particular path of anchors to provide data from the sending anchor to the target device 414.

For clarity, FIGS. 3 and 4 will be discussed together. At block 302, the computing system 10 may identify data for transmission to a target device 414. For example, it may be desirable to provide anchor characteristics (e.g., status, location) and/or other data D1 from a sending anchor (e.g., A1 402) to a target device 414 for downstream analysis by the target system.

At block 304, a determination is made as to whether the target device (e.g., target server 414) may be attainable without transmitting data through the intermediate anchors. That is, an analysis of the location (e.g., a GPS location, a coordinate data, and/or additional anchor connections) of the source anchor (e.g., the anchor providing data to the target device 414) may be performed to determine whether the source anchor may be connected to subsequent anchors and specifically, whether the source anchor is directly connected to the target device 414. For example, the source anchor may be too far from the target device for direct communication and/or may otherwise determine that the source device is not directly connected to the target device 414. Further, in some embodiments, this may be done by providing a broadcast request to all anchors, polling the anchors for an indication of the anchors that they can communicate with. Upon receiving responses, a map of the anchor connections can be generated. In some embodiments, this indication may be stored as an anchor characteristic of each of the anchors. FIG. 4 illustrates such a map. As illustrated, an anchor A1 is not directly connected to target device 414. Accordingly, data D1 cannot reach the target device 414 without connecting through intermediate nodes. However, anchor A3 406, when acting as a source anchor sending data D3 to target device 414 is directly connected to the target device 414.

With the preceding in mind, the anchor characteristics may be used to determine that the preferred path may be the direct path from the source anchor to the target device 414. At block 306, when the target device 414 is directly attainable/reachable without intermediate node communication, the source anchor may transmit the data directly to the target device 414 (e.g., server, client device). For example, if the first node was A3 406, it could directly communicate with target server 414 and would, thus, provide data via a direct connection. In some embodiments, the target device 414 may be a server or the central controller that accumulates or stores the transmitted data for the threshold period of time. In other embodiments, the target device 414 may be the client device that may be a smartphone, a computer, a laptop, or the like that may display the transmitted data on the display 20 for the user to view in real-time. A determination may be made that that the data transmission may be completed and begin gathering anchor characteristics for a subsequent data transfer from the source anchors to the target device 414.

Additionally or alternatively, a determination may be made that the one or more intermediate anchors 404, 410, 412 may be needed to transmit the data from the source anchor to the target device 414. At block 308, upon such a determination, the one or more intermediate anchors with the preferred path to the target device 414 may be identified. For example, if the first anchor is A4 408, two intermediate anchors, A5 410 and A6 412 that link with A4 408 may be identified as intermediate anchors to target device 414. In some embodiments, the anchor characteristics of the intermediate anchors may be used to identify the preferred path of anchors with which to transmit data from the source anchor to the target device 414. For example, A5 410 may include anchor characteristics that indicate data connections between A4 and A5 and A5 and A6 already exist and are reliable. In such a case, a path preference of A4→A5→A6 may be identified over a path A4→A6 when there are no anchor characteristics indicating a reliable connection between A4 and A6. In some embodiments, the distance between anchors may be used to identify a preferred path. For example, the longest distance between two anchors of a path may be determined and the longest paths may be compared to select a pathway with the shortest longest path, as the longest paths may represent the weakest link in the pathways. In some embodiments, the preferred path may be identified based upon a path with the least number of connections (anchor to anchor segments) that exceed a threshold distance.

As illustrated, the anchors may provide their own data along with the data of other anchors along the pathway. For example, A1 402 provides D1 to A2 404, which has its own data D2 to send downstream. Accordingly, A2 404 can transmit both received data D1 and its own data D2 to a downstream anchor (e.g., A6 412) requesting that the data be forwarded on to the target device 414.

With the preceding in mind, at block 310, the data may be provided to the anchors (e.g., from the source anchor to the intermediate anchors to the target device 414) based upon identified preferred path. For example, the anchor A4 408 may transmit data D4 regarding the equipment health and/or performance to the subsequent intermediate anchor A5 410, which has its own data D5. Anchor A5 410 may transmit the received data D4 and its own data D5 to the next subsequent anchor A6 412. As such, the data transmitted by anchor A6 412 to the target server 414 may be the combined data of D4, D5, and D6. In another example, the anchor A1 402 may act as a source anchor desiring to transmit data to the target device 414. The preferred path may contain two intermediate nodes (e.g., the intermediate anchors A2 404 and A6 412). Data communication may be facilitated between the first anchor A1 402 to the intermediate anchor A2 404 (e.g., D2), then from the intermediate anchor A2 404 to the intermediate anchor A6 412. The intermediate anchor 412 may transmit the data D1, D2, and D6 (e.g., of the source anchor and intermediate anchors) to the target device 414 for storage or transmission.

It is important to note that in some embodiments, the preferred path may be determined anchor by anchor at each anchor along the path. Accordingly, blocks 308 and 310 may be performed iteratively together. For example, A1 402 may decide it's preferred anchor to send data to is A2 404. A2 404 may receive the data D1 from A1 402 and may determine between A4 and A6, which is a preferred anchor to communicate with. Whichever anchor A2 404 forwards the data to may then decide the next best anchor in the path to forward the data to, given the goal of the data D1 reaching the target device 414.

In some embodiments, the target device 414 may be the server or the central controller that accumulates or stores the transmitted data for the threshold period of time. For example, the target device 414 may be the central controller that may accumulate or aggregate the transmitted data until the threshold period of time passes. In some embodiments, the threshold period of time may be a predetermined time period set by the user for data collection. In other embodiments, the threshold period of time may also be an indication from the user requesting data transmission. For example, the user may indicate to the computing system 10 to transmit the data over the network to the reliable connection for the user to view and analyze.

Figure 5:
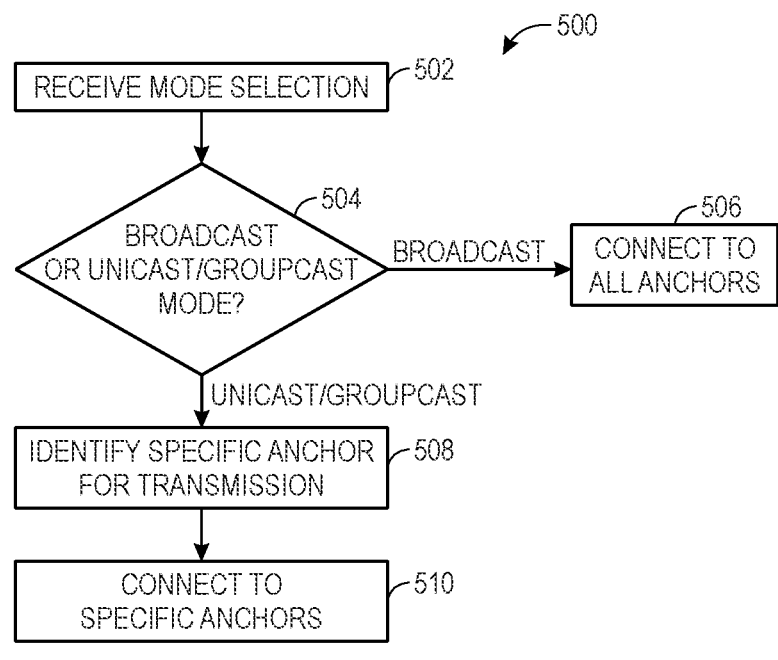
FIG. 5 illustrates a flow diagram of a process for selecting between a broadcast mode and/or a peer-to-peers mode, in accordance with embodiments described herein.
Figure 6:
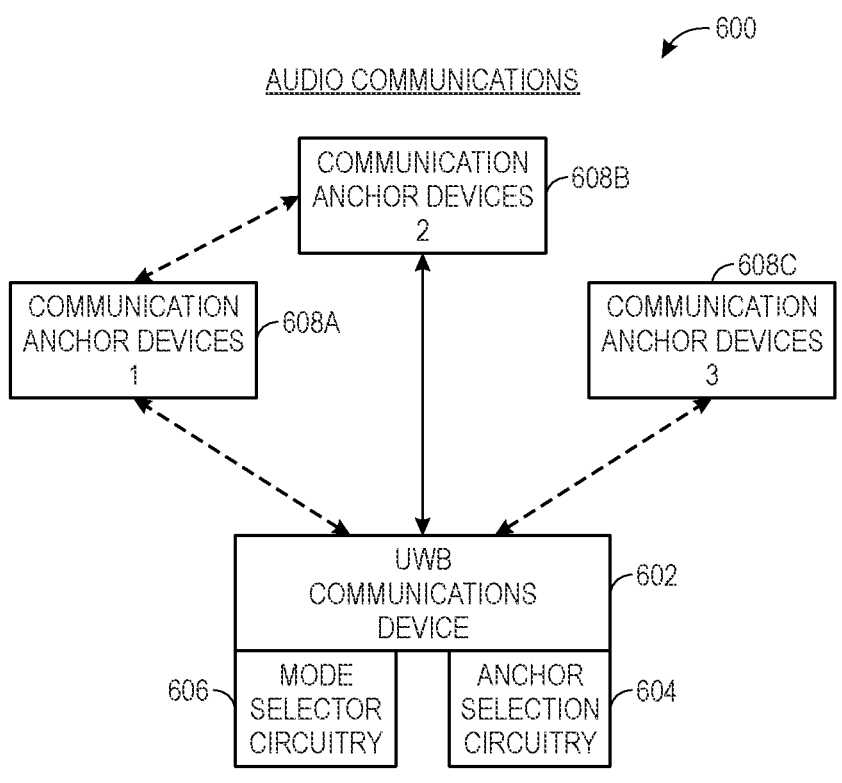
FIG. 6 illustrates a block diagram of a system communicatively coupled to one or more anchors, in accordance with embodiments described herein.

FIGS. 5 and 6 relate to a process 500 and a system 600 for UWB communications. For clarity, these figures will be discussed together.

FIG. 5 is an example process 500 for selecting between different modes of audio communication (e.g., the broadcast mode and the peer-to-peer or peers mode). That is, the user may operate the UWB communication device to facilitate audio communication between the one or more anchors 24 (e.g., peer-to-peer or peers mode) or generally to the all of the anchors 24 (e.g., broadcast mode). Although the example described in FIG. 5 is described in a particular order, it should be noted that the example process 500 may be performed in any suitable order and is not limited to the order presented herein. It should also be noted that although each processing block is described below is the example process 500 as being performed by the UWB communication device 602, other suitable computing systems may perform the processes described herein.

With the foregoing in mind, FIG. 6 is block diagram of an UWB communications system communicatively coupled to one or more anchors (e.g., 608A, 608B, and/or 608C, collectively 608). The system may include a UWB communication device 602, a mode selector circuitry 606, an anchor selection circuitry 604, and one or more communication anchor devices 608. In some embodiments, the UWB communication device 602 may be a laptop, the special glasses (e.g., augmented reality, virtual reality), a smart microphone, the headset, or the like. The UWB communication device 602 may also include anchor selection circuitry 604 that may target the one or more communication anchor devices 608 to facilitate data communication. In some embodiments, the one or more communication anchor devices 608 may comprise the headset, a pair of headphones, a pair of earbuds, a plurality of sensors, or the like. The UWB communication device 602 may also include the mode selector circuitry 606 that may determine the preferred data communication mode (e.g., the UWB mode, the BLE mode, or the BLE/UWB mode) for facilitating data communication (e.g., audio signals, text) between the UWB communication device 602 and the one or more communication anchor devices 608.

With the foregoing in mind, the UWB communication device 602 may be operated by the user to facilitate data communication to the one or more communication anchor devices 608. At block 502, UWB communication device 602 may receive an indication from the user regarding the audio communication mode (e.g., the broadcast mode, the peer-to-peers mode). For example, the user may wish to operate the UWB communication device 602 in the broadcast mode to address the audience using the communication anchor device 608. As such, the user may indicate to the UWB communication device 602 to operate in the broadcast mode and transmit data to all operating communication anchor devices 608. In another example, the user may be a presenter and wish to communicate with a particular person/device (e.g., the event host/event host device). As such, the user may indicate to the UWB communication device 602 to operate in the peer-to-peer or peers mode and target the communication anchor device 608B associated with the event host. In some embodiments, the communication anchor device 608B associated with the event host may have the display and the user may use a text-to-speech function to transmit a text message to the event host. In yet another example, the user operating the UWB communication device 602 may wish to address a specific group of attendees (e.g., audience on the left side of a room). As such, the user may indicate to the UWB communication device 602 to operate in the peer-to-peer or peers mode and facilitate data communication with the one or more communication anchor devices 608 associated with the left audience.

At block 504, the UWB communication device 602 may determine the audio communication mode (e.g., the broadcast mode, the peer-to-peers mode) selected by the user. For example, the UWB communication device 602 may receive indication (e.g., via the mode selector circuitry 606) from the user to operate in the broadcast mode. At block 506, the UWB communication device 602, via the anchor selection circuitry 604, may operate in the broadcast mode and transmit a request to all of the communication anchor devices 608 to operate in the broadcast mode. In some embodiments, the UWB communication device 602, via the anchor selection circuitry 604, may establish a connection with all of the communication anchor devices 608 present in the environment. In other embodiments, the UWB communication device 602 may skip the handshake step and automatically establish the connection with all of the communication anchor devices 608 in the environment. For example, the UWB communication device 602 may have a list of the communication anchor devices 608 in the environment and automatically connect, via the anchor selection circuitry 604, with them all in the broadcast mode. In some embodiments, the UWB communication device 602 may handshake with all of the communication anchor devices 608 prior establishing a connection with the one or more communication anchor devices 608. For example, the event host may prepare for the event by pre-handshaking or registering the UWB communication device 602 with all of the communication anchor devices 608. As such, the audience may pick up their communication anchor device 608 at the start of the event and the communication anchor device 608 may not need to complete additional handshaking for data communication.

At block 508, when the UWB communication device 602 may receive indication from the user to operate in the peer-to-peer or peers mode, the anchor selection circuitry 604 may identify specific communication anchor devices 608 for audio communication. At block 510, the computing system 10 may connect to the subset of the one or more communication anchor devices 608 to facilitate data communication (e.g., audio, text). That is, the UWB communication device 602 may begin facilitating audio data communication in the peer-to-peers mode. That is, UWB communication device 602, via the mode selector circuitry 606, may operate in the peer-to-peer or peers mode and, via the anchor selection circuitry 604, identify a subset of communication anchor devices 608 for facilitating data communication (e.g., audio, text). In an embodiment, the user may point the UWB communication device 602 in a desired direction and indicate to the UWB communication device 602, via the anchor selection circuitry 604, to establish the connection with the subset of communication anchor devices 608 in the pointed direction. For example, the user may be the conference speaker and point the UWB communication device 602 (e.g., microphone) in the direction of the event host to indicate data communication in the peer-to-peers mode. In other embodiments, the user may have the predetermine list of the one or more communication anchor devices 608 to establish the connection with and input the list to the UWB communication device 602 before the event. For example, the user may create the list of the one or more communication anchor devices 608 to be used in the left side of the environment. As such, the user may point the UWB communication device 602 to the left side of the environment and begin establishing the connection with the preselected communication anchor devices in the peer-to-peers mode.

Still in other embodiments, the UWB communication device 602 may begin establishing the connection with the one or more communication anchor devices 608 by requesting the handshake. The handshake may comprise of requesting the anchor characteristics (e.g., status, location) of the one or more communication anchor devices 608. For example, the location of the one or more communication anchor devices 608 may be within the desired range (e.g., pointed direction) of the UWB communication device 602 and as such, the anchor selection circuitry 604 may transmit a request for communication. In some embodiments, the one or more communication anchor devices (e.g., 608A) may be in the desired range but outside of the range data communication. In an example, the one or more communication anchor devices 608B may be used to receive data communication within a certain range of the environment (e.g., main concert hall, auditorium) and forward the data communications to other anchor devices outside of the communications range (e.g., 608A). In one example, a concert goer may take the one or more communication anchor devices 608A outside of the main concert hall, but may want to continue to receive communication from the UWB communication device 602 (e.g., microphone). As such, the one or more communication anchor devices 608A and 608B may form the daisy chain network to receive data communication from other communication anchor devices (e.g., 608B) present in the main concert hall and the UWB communication device 602.

In some embodiments, the one or more communication anchor devices 608 may receive the request for communication and may either approve, deny, defer, or the like. For example, the event host may be communicating with the user and receive another request for communication. The event host may defer the request until a later time. In some embodiments, the event host may accept the request for communication and specify a channel for the communication. That is, the UWB communication device 602 and the one or more communication anchor devices 608 may communicate in different channels and different frequencies depending on the data communication mode. In another example, the user may transmit an urgent request to connect with the event host during their presentation and as such, the event host may automatically approve the request and communicate with the user. In some embodiments, the user may have a pre-set list of text messages (e.g., "change slide," "end presentation," "dim lights") and may select from the pre-set list of text messages to transmit to the event host. In other embodiments, the user may communicate to the event host on the separate channel and may give the event host instructions. That is, the user and the event host may communicate on the separate channel different from the one the user may communicate with the audience. As such, the audience may not hear the communication between the user and the event host.

In some embodiments, the one or more communication anchor devices 608 may accept the handshake and transmit an acknowledgement to the UWB communication device 602. Additionally or alternatively, the UWB communication device 602 may transmit the acknowledgement to the one or more communication anchor devices 608 after receiving the approval for the handshake.

Figure 7:
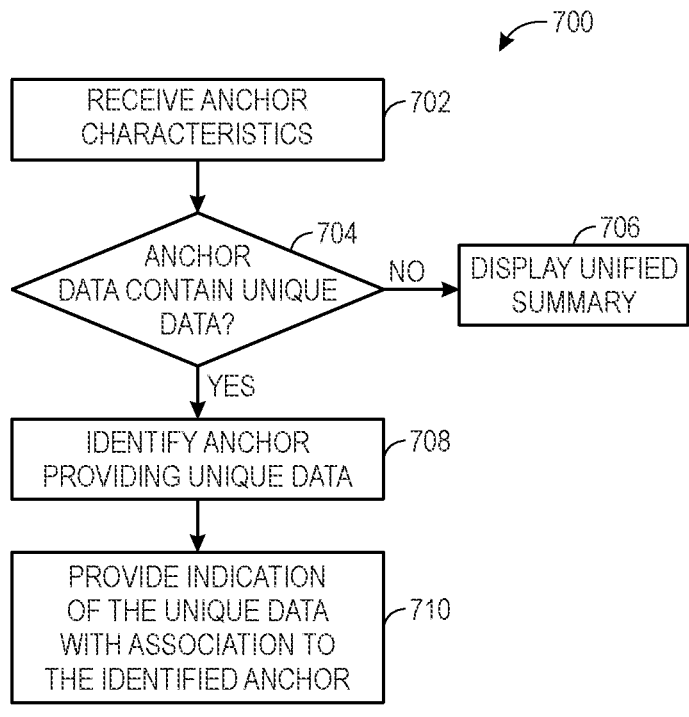
FIG. 7 illustrates a flow diagram of a process for identifying unique data, in accordance with the embodiments described herein.

FIG. 7 is an example process 700 for identifying and pinpointing unique data among the one or more anchors 24. Although the example described in FIG. 7 is described in a particular order, it should be noted that the example process 700 may be performed in any suitable order and is not limited to the order presented herein. It should also be noted that although each processing block is described below is the example process 700 as being performed by the computing system 10, other suitable computing systems may perform the processes described herein.

Figure 8:
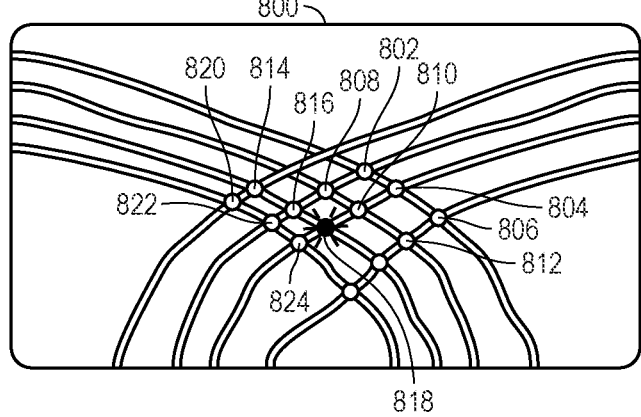
FIG. 8 illustrates an example view through augmented reality glasses for identifying the unique data in FIG. 7, in accordance to the embodiments described herein.

FIG. 8 is an example view 800 from the computing system 10 (e.g., augmented reality glasses, virtual reality glasses) to identify unique data among the one or more anchors 24 (e.g., bundled anchors 802-824). In some embodiments, bundled anchors 802-824 (e.g., industrial sensors) may be placed in the crowded environment (e.g., bundled wires, close pipes, network wires) and may transmit anchor characteristics (e.g., data regarding the equipment health and/or performance). The user may use special (e.g., augmented reality, virtual reality) glasses to view the data. For clarity, FIGS. 7 and 8 will be discussed together.

With the foregoing in mind, at block 702, the computing system 10 may receive anchor characteristics (e.g., status, location, equipment health and/or performance) from the bundled anchors 802-824. In some embodiments, the status of the bundled anchors 802-824 may be in standby mode and the user may indicate to the computing system 10 to switch the status of the bundled anchors 802-824 to the operational mode, enabling the anchors to provide data to the computing system 10. In other embodiments, the bundled anchors 802-824 may remain in the operational mode and continuously transmit data in the UWB mode. Still in other embodiments, the bundled anchors 802-824 may switch between the UWB mode, the BLE mode, and the BLE/UWB mode to facilitate data communication.

In some embodiments, the computing system 10 may be special (e.g., augmented reality, virtual reality) glasses to view the anchor characteristics (e.g., equipment health and/or performance) of the bundled anchors 802-824. For example, the user may want to view the anchor characteristics of the bundled anchors 802-824 (e.g., industrial sensors) placed in the crowded environment (e.g., network cables). The bundled anchors 802-824 (e.g., industrial sensors) may monitor the equipment health and/or performance of the network cables and may transmit to the augmented reality glasses different colors indicating the health and/or performance of the network cables. For example, the augmented reality glasses may analyze the anchor characteristics and display the view 800 to the user. As such, the user may quickly determine that the bundled anchor 818 may contain unique data and indicate that the corresponding network cable may be failing.

At block 704, the computing system 10 may determine whether the received anchor data contains unique data. For example, the computing system 10 may receive the anchor characteristics (e.g., equipment health and/or performance) and determine whether unique data may be present. That is, the data regarding the equipment health and/or performance may indicate whether the equipment may be failing, close to failing, or operational. When the status indications provided by the anchors are all the same/similar, there may not be a desire to pinpoint particular anchors with a status indication. In such a case, a status indicator of the bundled anchors 802-824 may be provided rather than the status of individual anchors. In contrast, when particular anchors provide diverging status indications, the user may wish to see the locations of specific ones of the anchors 802-824.

Accordingly, in some embodiments, the computing system 10 may determine that the anchor characteristics of the bundled anchors 802-824 may not reflect unique data. In such a case, at block 706, the computing system 10 may display the unified summary, which may be a single status indication of the non-unique data. For example, the user wearing the augmented reality glasses may see a green light for the bundled anchors 802-824. For example, the computing system 10 may determine status of the bundled anchors 802-824 may be uniform and may provide a generic status indication for all of the anchors. In such a case, precise location tracking may not be necessary. In some embodiments, the computing system 10 may determine that precise location tracking may not be needed and operate in the BLE mode or the BLE/UWB mode, as discussed above.

In other embodiments, the computing system 10 may determine that anchor characteristics of the bundled anchors 802-824 may contain unique data. For example, the computing system 10 may determine that the status of the bundled anchors 802-824 may not be uniform and may require precise location tracking to identify and provide a status indication for a specific anchor 818. At block 708, the computing system 10 may determine which specific anchor 818 may be providing the unique data. For example, the computing system 10 may recognize that the status for the specific anchor 818 may be different from the bundled anchors 802-816 and 820-824 or recognize that the status for the specific anchor 818 may be the failure mode. As such, the user wearing the augmented reality glasses may view a red light for the specific anchor 818 rather than the green light. In some embodiments, the computing system 10 may determine that the environment may be crowded and operate in the UWB mode for precise location tracking. In other embodiments, the computing system 10 may determine that the environment may be spare, the bundled anchors 802-824 may not require precise location tracking, and operate in the BLE mode or BLE/UWB mode.

At block 710, the computing system 10 may provide an indication of the unique data. As described above, the specific anchor 818 (e.g., broken equipment, failing sensor) in the bundled anchors 802-824 may display the red light instead of the green light. As such, the user wearing the augmented reality glasses may quickly identify the specific anchor 818 due to the indication of unique data.

The techniques and methods described herein may be applied with other types of data communication. For example, it can also be applied to environments such as storage centers for databases or servers, underground or underwater networks, public transportation systems, and buildings such as commercial buildings, homes, or farms.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more anchors; and
a computing system in communication with at least a subset of the one or more anchors comprising a communication mode adjustment circuitry configured to:
receive one or more anchor characteristics corresponding to each of the one or more anchors, wherein each of the one or more anchor characteristics indicates the location of the respective corresponding anchor;
calculate a relative spacing between the one or more anchors based on an aggregation of the one or more anchor characteristics;
determine whether the relative spacing between the one or more anchors indicates a crowded spacing among the one or more anchors;
determine that precision is needed when the relative spacing between the one or more anchors indicates the crowded spacing among the one or more anchors and that precision is not needed when the relative spacing between the one or more anchors does not indicate the crowded spacing among the one or more anchors; and
selectively activate:
ultra-wideband (UWB) tracking in response to determining that precision is needed; or
Bluetooth Low Energy (BLE) tracking in response to determining that precision is not needed.

2. The system of claim 1, wherein the communication mode adjustment circuitry is configured to activate a hybrid BLE/UWB tracking in response to determining that precision is not needed.

3. The system of claim 1, wherein the anchor characteristic comprises a status, a location, connections to subsequent anchors, or any combination thereof.

4. The system of claim 1, wherein the communication mode adjustment circuitry is configured to:
receive an audio communication mode selection;
activate the UWB tracking or Bluetooth low-energy (BLE) based at least in part upon the audio communication mode selection.

5. The system of claim 4, wherein the audio communication mode comprises a broadcast mode, a peer-to-peer mode, or a peer-to-peers mode.

6. The system of claim 5, wherein the peer-to-peer mode and the peer-to-peers mode comprises a handshake step, an acknowledgement step, or a connection step, or any combination thereof performed using the UWB tracking when the relative spacing between the one or more anchors indicates the crowded spacing among the one or more anchors.

7. The system of claim 1, wherein the communication mode adjustment circuitry is configured to selectively activate ultra-wideband (UWB) tracking for a first subset of the one or more anchors and selectively activate Bluetooth Low Energy (BLE) tracking for a second subset of the one or more anchors.

8. The system of claim 1, wherein the communication mode adjustment circuitry is configured to:
receive an aggregated anchor characteristic comprising an indication of relative locations of the one or more anchors; and
calculate a relative spacing between the one or more anchors based on the aggregated anchor characteristic.

9. A method, comprising:
receiving, via a communication mode adjustment circuitry, one or more anchor characteristics corresponding to each of one or more anchors, wherein each of the one or more anchor characteristics indicates the location of the respective corresponding anchor;
calculating, via the communication mode adjustment circuitry, a relative spacing between the one or more anchors based on an aggregation of the one or more anchor characteristics;
determining, via the communication mode adjustment circuitry, whether the relative spacing between the one or more anchors indicates a crowded spacing among the one or more anchors;
activating, via the communication mode adjustment circuitry, a data communication mode, an audio communication mode, or both;
connecting, via the communication mode adjustment circuitry, to the one or more anchors based on the one or more anchor characteristics and the relative spacing between the one or more anchors; and
transmitting, via the communication mode adjustment circuitry, data to the one or more anchors.

10. The method of claim 9, wherein the data communication mode comprises an ultra-wideband (UWB) mode, a Bluetooth low-energy mode (BLE), and a hybrid BLE/UWB mode.

11. The method of claim 10, wherein the UWB mode is activated in response to determining that the relative spacing between the one or more anchors indicates the crowded spacing between the one or more anchors.

12. The method of claim 11, wherein the hybrid BLE/UWB mode is activated in response to determining that the relative spacing between the one or more anchors no longer indicates the crowded spacing among the one or more anchors.

13. The method of claim 10, comprising receiving, via the communication mode circuitry, an indication representative of the data communication mode.

14. The method of claim 9, wherein the one or more anchor characteristics indicate a unified summary.

15. The method of claim 9, wherein the audio communication mode comprises a broadcast mode and a peer-to-peers mode.

16. A non-transitory computer-readable medium comprising computer-executable instructions that, when executed by at least one processor, causes the at least one processor to perform operations comprising:

connecting, via the at least one processor, to one or more anchors;

receiving, via the at least one processor, one or more anchor characteristics corresponding to each of one or more anchors, wherein each of the one or more anchor characteristics indicates a location of the respective corresponding anchor;

calculating, via the at least one processor, a relative spacing between the one or more anchors based on an aggregation of the one or more anchor characteristics;

determining, via the at least one processor, whether the relative spacing between the one or more anchors indicates a crowded spacing among the one or more anchors;

determining, via the at least one processor, that precision is needed when the relative spacing between the one or more anchors indicates the crowded spacing among the one or more anchors and that precision is not needed when the relative spacing between the one or more anchors does not indicate the crowded spacing among the one or more anchors;

activating, via the at least one processor, an ultra-wideband (UWB) mode in response to determining that precision is needed and a Bluetooth low-energy (BLE) mode in response to determining that precision is not needed; and transmitting, via the at least one processor, anchor data from a first anchor to a target device.

17. The non-transitory computer-readable medium of claim 16, wherein the computer-executable instructions cause the at least one processor to perform operations comprising causing the first anchor to directly transmit the anchor data to the target device.

18. The non-transitory computer-readable medium of claim 16, wherein the computer-executable instructions cause the at least one processor to perform operations comprising determining at least one or more intermediate anchors between the first anchor and the target device.

19. The non-transitory computer-readable medium of claim 16, wherein the computer-executable instructions cause the at least one processor to perform operations comprising determining a preferred path from the first anchor to the target device.

20. The non-transitory computer-readable medium of claim 16, wherein the computer-executable instructions cause the at least one processor to perform operations comprising activating an ultra-wideband (UWB) mode or a hybrid BLE/UWB mode in response to determining that precision is needed when the relative spacing between the one or more anchors indicates the crowded spacing among the one or more anchors.

* * * * *